United States Patent
Peterson

(10) Patent No.: US 9,681,653 B2
(45) Date of Patent: Jun. 20, 2017

(54) PORTABLE ORGANIC HERBICIDE APPLICATOR

(71) Applicant: WEEDS NEVER SLEEP LLC, Portland, OR (US)

(72) Inventor: Michael Peterson, Portland, OR (US)

(73) Assignee: WEEDS NEVER SLEEP LLC, Portland, OR (US)

(*) Notice: Subject to any disclaimer, the term of this patent is extended or adjusted under 35 U.S.C. 154(b) by 400 days.

(21) Appl. No.: 13/970,470

(22) Filed: Aug. 19, 2013

(65) Prior Publication Data

US 2014/0053453 A1    Feb. 27, 2014

Related U.S. Application Data

(60) Provisional application No. 61/691,764, filed on Aug. 21, 2012.

(51) Int. Cl.
| | | |
|---|---|---|
| *A01M 21/04* | (2006.01) | |
| *A01M 7/00* | (2006.01) | |
| *A01M 21/00* | (2006.01) | |
| *A01M 25/00* | (2006.01) | |

(52) U.S. Cl.
CPC .......... *A01M 7/0046* (2013.01); *A01M 21/00* (2013.01); *A01M 21/04* (2013.01); *A01M 21/043* (2013.01); *A01M 25/008* (2013.01)

(58) Field of Classification Search
CPC ..... A01M 21/00; A01M 21/04; A01M 21/043
USPC ...................... 47/1.5, 57.7; 43/129
See application file for complete search history.

(56) References Cited

U.S. PATENT DOCUMENTS

| | | | | |
|---|---|---|---|---|
| 2,605,137 | A | * | 7/1952 | Ofeldt .............................. 239/10 |
| 4,272,920 | A | * | 6/1981 | Dawson ..................... 47/58.1 R |
| 4,357,779 | A | | 11/1982 | Maddock |
| 4,409,755 | A | | 10/1983 | Maddock |
| 4,748,769 | A | * | 6/1988 | Kolskog et al. .................. 47/1.5 |
| 4,899,488 | A | * | 2/1990 | Faulkner ......................... 47/57.5 |
| 5,297,730 | A | * | 3/1994 | Thompson ...................... 239/13 |
| 5,385,106 | A | | 1/1995 | Langshaw |
| 5,430,970 | A | | 7/1995 | Thompson et al. |
| 5,527,366 | A | * | 6/1996 | Mazurkiewicz ........... 47/58.1 R |
| 5,575,111 | A | | 11/1996 | Rajamannan |
| 5,822,968 | A | | 10/1998 | Savala |
| 5,866,058 | A | | 2/1999 | Batchelder et al. |

(Continued)

FOREIGN PATENT DOCUMENTS

| | | |
|---|---|---|
| CA | 2104760 A1 | 2/1994 |
| CA | 2197093 A1 | 2/1996 |

(Continued)

*Primary Examiner* — David Parsley
(74) *Attorney, Agent, or Firm* — Renaissance IP Law Group, LLP; David A. Crowther

(57) ABSTRACT

Embodiments provide an applicator configured to pressurize and heat a mixture of water and herbicide, and expel the heated and pressurized water/herbicide mixture from the applicator. In some embodiments, the herbicide may be an organic herbicide such as organic acids, simple sugars, surfactants, or ammonia. The applicator may include an inline heating element coupled with a spray tip of the applicator such that the inline heating element may receive a water/herbicide mixture from a water line of the applicator, heat the water/herbicide mixture, and then supply the water/herbicide mixture to the spray tip.

12 Claims, 5 Drawing Sheets

(56) References Cited

U.S. PATENT DOCUMENTS

| | | | |
|---|---|---|---|
| 5,870,852 A * | 2/1999 | Stanley | A01M 19/00 111/7.1 |
| 5,946,851 A | 9/1999 | Adey et al. | |
| 6,029,589 A | 2/2000 | Simpson | |
| 6,047,495 A * | 4/2000 | Matsumura | A01K 31/04 239/112 |
| 6,047,900 A * | 4/2000 | Newson et al. | 239/135 |
| 6,321,037 B1 | 11/2001 | Reid et al. | |
| 6,367,714 B1 * | 4/2002 | Smoot | 239/288.5 |
| 6,505,437 B1 * | 1/2003 | Johnstone et al. | 47/1.44 |
| 6,634,435 B2 | 10/2003 | Saeger | |
| 7,100,540 B2 | 9/2006 | Vaughan | |
| 7,190,890 B2 | 3/2007 | Higham et al. | |
| 7,654,470 B2 * | 2/2010 | Crosswell | 239/150 |
| 8,544,178 B2 | 10/2013 | Smiley | |
| 8,740,109 B2 | 6/2014 | Muston et al. | |
| 2003/0136048 A1 | 7/2003 | Newson | |
| 2007/0176316 A1 | 8/2007 | Musten et al. | |
| 2012/0216445 A1 * | 8/2012 | Aquilina | A01M 7/0042 43/132.1 |

FOREIGN PATENT DOCUMENTS

| | | |
|---|---|---|
| EP | 0920802 A1 | 6/1999 |
| EP | 1186234 B1 | 8/2005 |
| EP | 1450603 B1 | 6/2009 |
| WO | 9426102 A1 | 11/1994 |
| WO | 9529767 A1 | 4/1995 |
| WO | WO0078519 A1 | 12/2000 |
| WO | 2005060744 A1 | 7/2005 |

* cited by examiner

PORTABLE ORGANIC HERBICIDE APPLICATOR

CROSS-REFERENCE TO RELATED APPLICATIONS

The present application claims priority to U.S. Provisional Patent Application No. 61/691,764, filed Aug. 21, 2012, entitled "Portable Organic Herbicide Applicator," the entire disclosure of which is hereby incorporated by reference in its entirety.

TECHNICAL FIELD

Embodiments herein relate to a portable applicator for killing plants, such as weeds, or animals such as slugs or snails.

BACKGROUND

Current applicators for killing weeds, slugs or snails may suffer from significant drawbacks. For example, applicators may be bulky and require heavy backpacks or rollers to transport them effectively. This bulk may make the applicators impracticable to transport over uneven ground such as a grassy area. Alternatively, use of the applicators may be time consuming because plants may require an extended application from the applicators.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION

Figure 1:
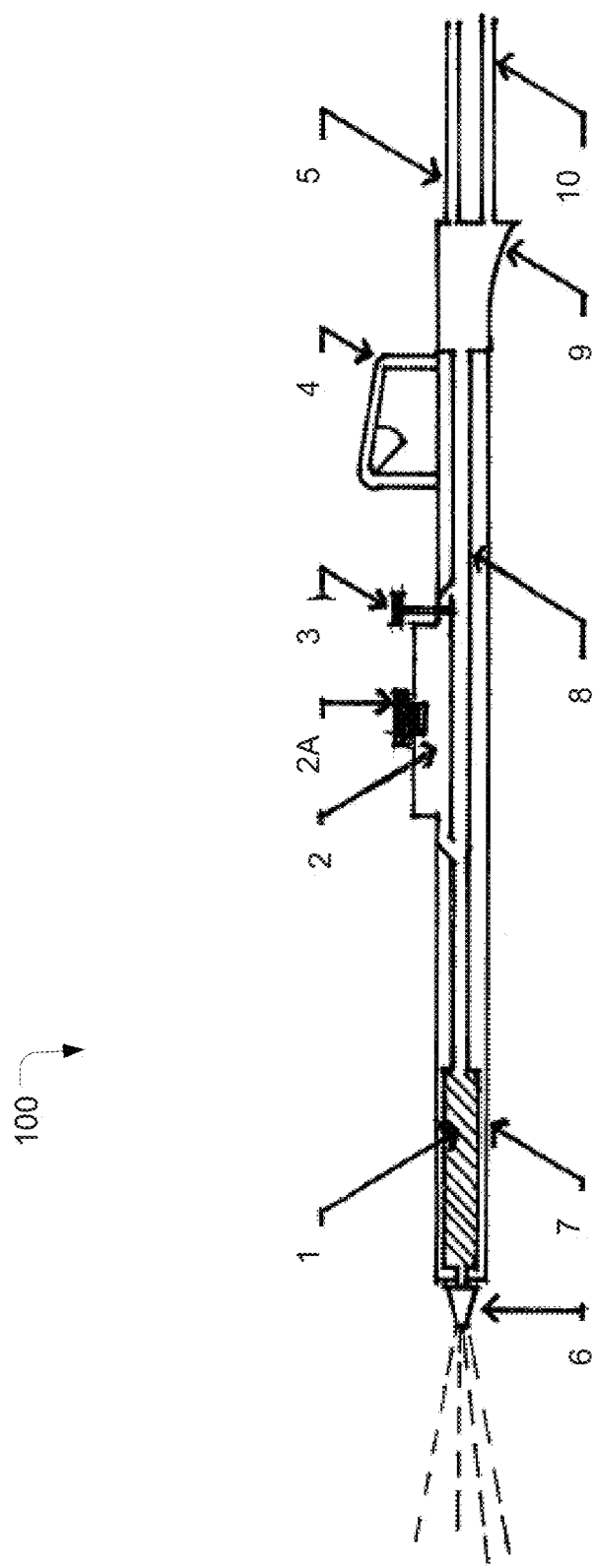
FIG. 1 illustrates a cross-sectional mid-sagittal view of an example of an applicator, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the spirit or scope of the present disclosure. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide an organic herbicide applicator. In some embodiments, the applicator may include one or both of the features of a pressurized and/or heated stream of liquid. For example, in some embodiments the applicator may expel liquid at a pressure at or above 250 pounds per square inch. Additionally or alternatively, the liquid may be heated to a temperature at or above 150 degrees Fahrenheit. In other embodiments a lower or higher temperature may be used.

In some embodiments the liquid expelled may only include water, while other embodiments may use a chemical or an organic herbicide such as organic acids, simple sugars, surfactants, ammonia, or some other chemical or organic herbicide mixed with the water. In embodiments, the chemical may be a chemical that is optimized to kill something other than plants, for examples slugs and/or snails. Hereinafter the term "liquid" will be used but may be understood to refer to water, herbicide, or a water/herbicide mixture, unless otherwise specifically noted.

This combination of pressurized and heated liquid may boost the efficacy of the applicator to maximize lethality to plants, slugs, or snails. Specifically, with respect to plants, herbicides may generally penetrate the cellular structure of a plant to kill the plant. A stream of pressurized and heated liquid may be more effective because the pressure and/or heat may aid the liquid in bursting the cells on the surface of a plant, thereby allowing the liquid to more quickly penetrate into deeper layers of the plant. Therefore, less liquid, for example less herbicide, may be required for a lethal dose of the liquid to be delivered to the plant.

The use of a directable and pressurized jet of liquid from the applicator may provide an additional benefit in that one or more of plant roots, tall plants, vertical surfaces, and confined spaces may also be targeted. Specifically, the applicator may be directable such that a pressurized jet of liquid may deliver the liquid to multiple different areas of the plant. For example, in one embodiment the pressurized jet of liquid may be applied to the root of the plant. In an alternative embodiment, the applicator may be directed or re-directed such that the liquid may be delivered to a foliar, or above ground, portion of the plant. For example, in this embodiment the liquid may be delivered to one or more of the leaves, stems, branches, or trunk of the plant.

In certain embodiments, the applicator may expel the liquid at a pressure at or above 250 pounds per square inch. In the embodiment described above where the liquid is directed to the roots of a plant, a direct application of a jet of the pressurized liquid at this pressure may be sufficient to penetrate soil and reach the roots of the plant. In other embodiments, the applicator may expel the liquid at a greater or lesser pressure, such as, but not limited to, between 100 and 500 pounds per square inch. In some embodiments, a lower or higher pressure may be used to deliver a sufficient application/dose of liquid to a plant.

FIG. 1 shows an embodiment of the applicator 100. The applicator 100 may include an inline heating unit 1 configured to heat the liquid being expelled from the applicator 100. The inline heating unit 1 may be coupled with an herbicide chamber 2 which may include an herbicide chamber lid 2A. In this embodiment, liquid may be able to flow from the herbicide chamber 2 through the inline heating unit 1 before it is expelled from the applicator 100.

The herbicide chamber 2 may further contain a valve 3 that may be actuated to control whether liquid is allowed to enter the herbicide chamber 2 and mix with herbicide before the liquid is expelled from the applicator 100. In this manner, a user may actuate valve 3 to control whether only water or water mixed with herbicide are expelled from the applicator 100. In some embodiments, the valve 3 may be a simple valve that is either fully open or fully shut, or the valve 3 may allow for being only partially open such that the user may variably control the amount of herbicide in the water dependent on the user's preference or application. In other embodiments, more than one valve may be used.

The applicator 100 may also include a handle and trigger assembly 4. The handle and trigger assembly may be coupled with another valve (not shown) in the applicator 100 such that a user may depress the trigger to allow water to flow through the applicator 100 into the herbicide chamber 2 and be forcibly expelled from the applicator. The water may be fed into the applicator from a water supply line 5 that is placed between a water supply source (not shown) and the valve controlled by the handle and trigger assembly 4. FIG. 1 shows the water line 8 that connects the water supply line 5 and the handle and trigger assembly 4. In some embodiments, the user may depress the handle and trigger assembly 4 to open the valve (not shown) such that water flows from the water supply line 5 into the water line 8. Although in FIG. 1 the handle and trigger assembly 4 are shown as part of a top portion of the applicator 100, in other embodiments the handle and trigger may be on a side or bottom portion of the applicator 100. In some embodiments, the handle and trigger may be separate from one another.

The applicator 100 may further include a spray tip 6 that may be used to expel the water from the applicator 100. In some embodiments, the spray tip 6 may be adjustable such that certain characteristics of the liquid exiting the applicator 100 may be altered. For example, the distance, width, or shape of the spray exiting the applicator 100 through spray tip 6 may be changed by adjusting spray tip 6, such as by swapping the tip for an alternate tip or rotating the tip to align certain dispensing holes and/or to adjust the dispensing aperture. In other embodiments, spray tip 6 may not be adjustable. As shown in FIG. 1, the inline heating unit 1 may be generally located between the spray tip 6 and the herbicide chamber 2. In some embodiments, the inline heating unit 1 may receive the liquid, heat the liquid and provide the heated liquid directly to spray tip 6. Locating inline heating unit 1 relatively close to spray tip 6 may provide the advantage of limiting heat loss which may otherwise occur if, for example, inline heating unit 1 were located further upstream, such as prior to herbicide chamber 2.

The inline heating unit 1 may or may not be surrounded by some form of an insulated jacket 7. In certain embodiments, the insulated jacket 7 may be made of any soft or hard insulating material such as a vacuum chamber, NBR/PE rubber foam, ceramic fiber, or some other insulating material. In other embodiments, the applicator 100 may not have the insulated jacket 7. In yet other embodiments, the insulated jacket 7 may be an internal element of the inline heating unit 1.

FIG. 1 further shows that the water line 8 may connect the water supply 5, the handle and trigger assembly 4, the herbicide chamber 2 and the inline heating unit 1. In operation, the user may depress the handle and trigger assembly 4 such that water may flow from the water supply line 5 through the water line 8. The water may or may not mix with herbicide from the herbicide chamber 2, depending on the position of valve 3. The water/herbicide mixture may then re-enter water line 8 before entering inline heating unit 1 where the pressurized liquid is heated and expelled from the applicator 100 via spray tip 6.

In some embodiments of the applicator 100, the applicator 100 may include a pump 9 connected to the water supply line 5. The pump 9 may be configured to do one or both of drawing water from the water supply line 5 and into the water line 8, and/or pressurizing the liquid in the water line 8 as discussed above. In other embodiments, the water line 8 and/or liquid may be pressurized from an outside source, or the water line 8 and/or liquid may be pressurized by a pump that is separate from the applicator 100. The pump may be powered by a power supply 10. The power supply may be provided via an electric cord, a battery, or some other form of power supply. In some embodiments, the pump 9 may be located in a location different than that shown in FIG. 1. In some embodiments, there may be a plurality of pumps such as pump 9, wherein a first pump is located prior to the herbicide chamber 2, e.g. between the herbicide chamber 2 and the water supply line 5 as shown in FIG. 1, while a second pump may be located generally between the herbicide chamber 2 and the inline heating unit 1. In other embodiments, one or more pumps may be located in additional or alternative locations of the applicator 100.

The above described applicator 100 may realize a number of significant benefits. For example, by having the inline heating unit 1 close to the spray tip 6, for example as the last element in the flow of the liquid through the applicator 100, the liquid may exit the applicator 100 without incurring significant heat loss. Additionally, the liquid may be expelled from the applicator 100 due to pressurization by the pump 9. The expulsion of the liquid due to pressurization by the pump 9, rather than for example flash heating by the inline heating unit 1, may have the benefit of expelling the water as liquid rather than a gas such as steam. The pressurized, heated, expelled liquid, which may or may not contain organic herbicide, may more significantly damage plants, slugs or snails, than if the liquid was expelled as, for example, steam.

Finally, the use of an organic herbicide such as ammonia, organic acids, simple sugars, or surfactants may result in significant benefits. For example, in-organic herbicides may break down and become ineffective when heated. Additionally, the in-organic herbicides may congeal or otherwise change consistency when they are heated so that blockages or part wear inside the applicator 100 may occur. By using an organic herbicide, the liquid may be less likely to change consistency or break down once it is heated and/or pressurized.

Figure 4:
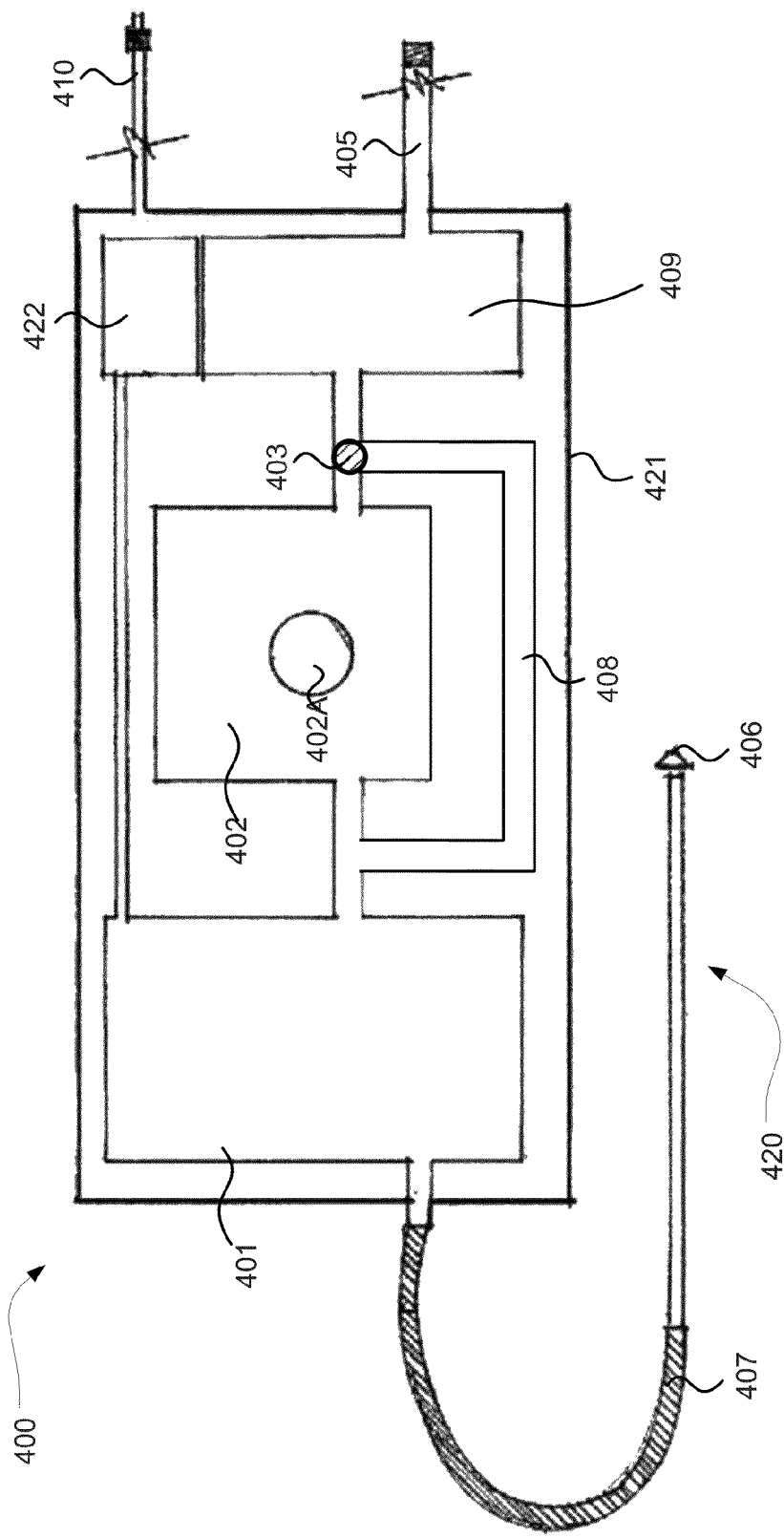
FIG. 4 illustrates an alternative example of an applicator, in accordance with various embodiments.

FIG. 4 depicts an alternative embodiment of an applicator 400. Similarly numbered elements may be similar to the elements of applicator 100 depicted in FIG. 1. Specifically, the applicator 400 may include an inline heating unit 401, which may be similar to inline heating unit 1, configured to heat liquid in the applicator 400. The liquid may be expelled from the inline heating unit 401 through a hose with an insulated jacket 407, and ultimately expelled from a spray tip 406 at the end of a wand 420. In embodiments, the hose within the insulated jacket 407 may be flexible such that the spray tip 406 may be easily directable by a user holding the wand 420. The insulated jacket 407 may be similar to insulated jacket 7, and spray tip 406 may be similar to spray tip 6.

Similarly to the applicator 100, the applicator 400 may further include a pump 409 coupled with a water supply line 405. Similarly to the water supply line 105 described above, the water supply line 405 may be coupled with a backpack, a hose, or some other type of water supply (not shown). The pump 409 may be configured to pressurize liquid from the water supply 405 through a water line 408. In some embodiments, the applicator 400 may include a valve 403 that may be similar to valve 3 discussed above. The valve 403 may be configurable by a user to be open, partially open, or shut. If the valve 403 is open or partially open, then pressurized liquid may flow from the pump 409 into herbicide chamber 402. Herbicide chamber 402 may include an herbicide chamber lid 402A through which a user may pour organic herbicide into the herbicide chamber 402. Similarly to applicator 100, the pressurized liquid may flow from one or both of the water line 408 and/or the herbicide chamber 402 in the inline heating unit 401. The pressurized liquid may include one or both of herbicide and water. Finally, a switch 422 may be coupled with the inline heating unit 401 and configured to activate or deactivate one or more of the inline heating unit 401, the pump 409, or the applicator 400 as a whole.

One or all of inline heating unit 401, herbicide chamber 402, water line 408, valve 403, switch 422, and pump 409 may be included within an applicator body 421 which in some cases may be metal or plastic. In some cases, the applicator body 421 may have a form factor small enough to be easily portable. For example, in some cases, the applicator body 421 may be approximately six inches high and twelve inches long, though in other embodiments the applicator body 421 may have larger or smaller measurements.

In some embodiments, as described above, the pump 409 may be located generally between the inline heating unit 401 and the herbicide chamber 402. In some embodiments, the applicator 400 may include a plurality of pumps such as pump 409 located between the herbicide chamber 402 and the water supply line 405, and then a second pump located generally between the inline heating unit 401 and the herbicide chamber 402. In other embodiments, one or more pumps may be located in additional or alternatives locations of the applicator 400.

Applicator 400 may share many of the same benefits of applicator 100. For example, by having the inline heating unit 401 relatively close to the wand 420, or as the last element in the flow of the liquid through the applicator 400, heat loss of the liquid may be minimized or avoided. Additionally, by pressurizing the applicator 400 using the pump 409 rather than the inline heating unit 401, the liquid may be expelled from the spray tip 406 as a liquid rather than a gas like steam. Finally, the use of an organic herbicide may minimize breakdown of the herbicide and/or damage to parts of the applicator 400.

Figure 5:
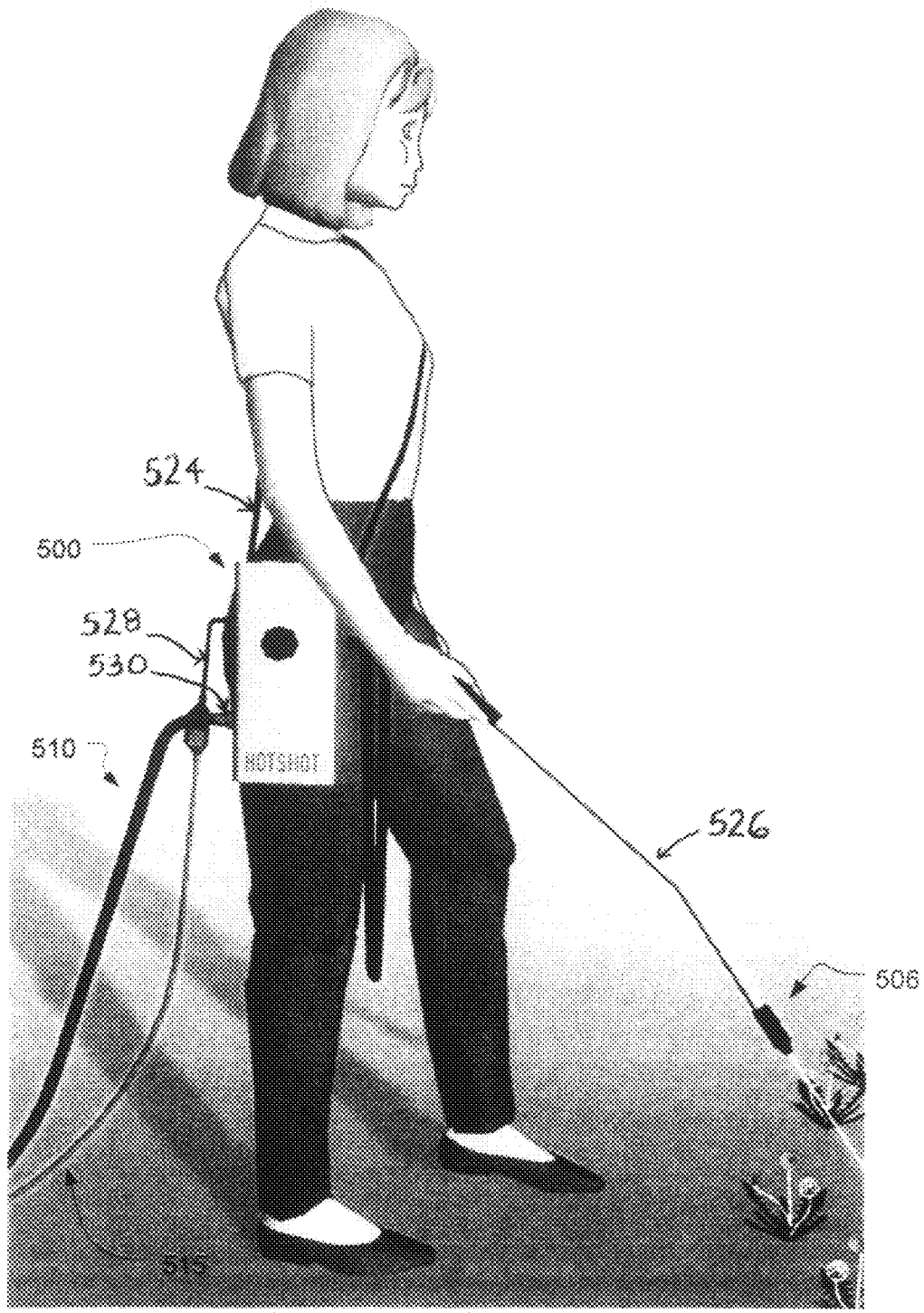
FIG. 5 depicts an example of a user using an applicator, in accordance with various embodiments.

FIG. 5 depicts an example of a user using a body worn applicator 500 including a strap 524. The applicator 500 may be similar to applicator 400 and include a hand held wand 526 including a spray tip 506 which may be similar to spray tip 406. The applicator 500 may be coupled with one or both of an electrical line 515 with an electric connector 528 and a water line 510 with a water line connector 530. In other embodiments, not shown, the applicator 500 may be coupled with a battery or a different source of water, e.g. a backpack.

Figure 2:
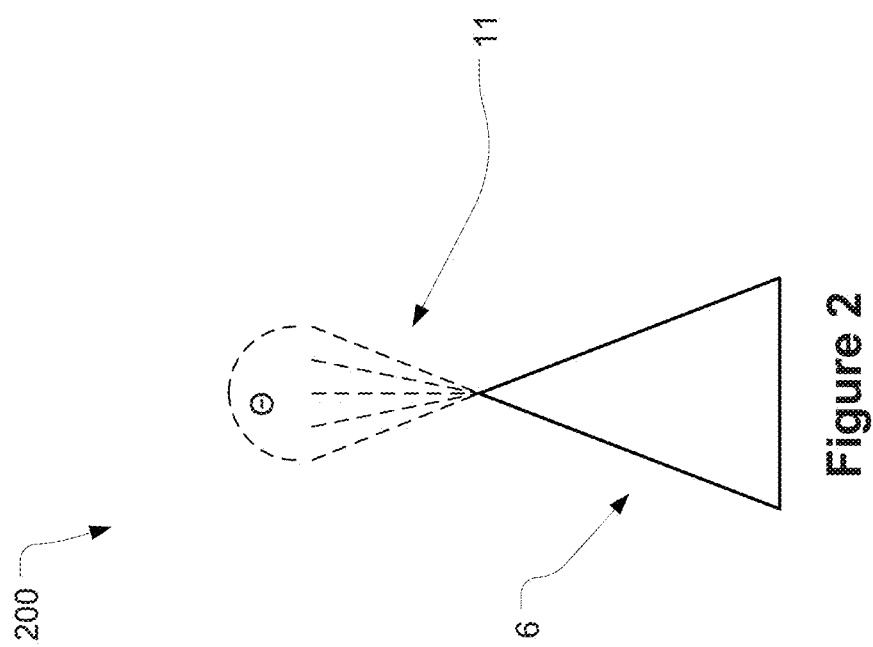
FIG. 2 illustrates an example spray pattern of an applicator, in accordance with various embodiments.
Figure 3:
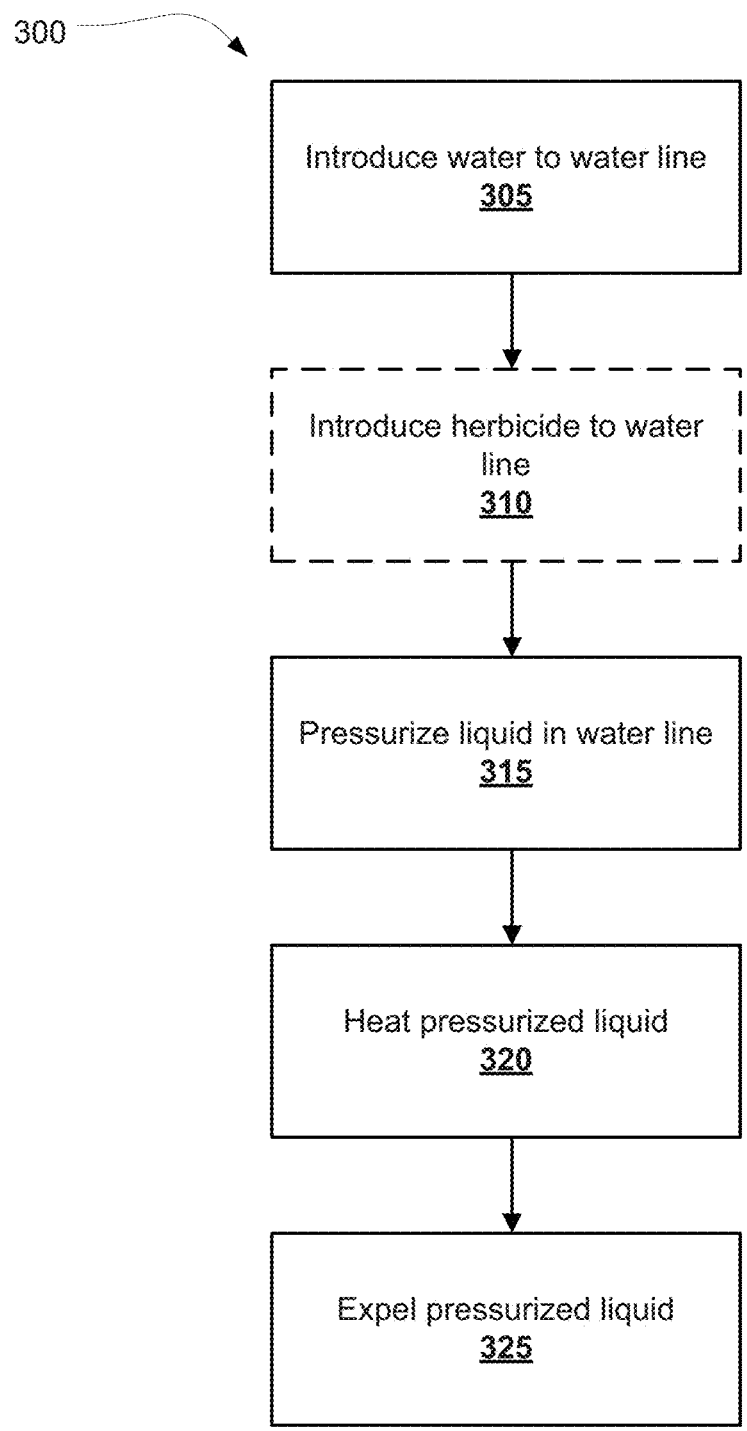
FIG. 3 illustrates an example method of using the applicator, in accordance with various embodiments.

FIG. 2 shows an example 200 of the liquid being expelled from the spray tip 6 of the applicator 100, or spray tip 406 of the applicator 400. The liquid may exit the spray tip 6 or 406 in a spray 11 with an angle $\Theta$. In one embodiment, the angle $\Theta$ of the spray 11 can be one degree. In other embodiments the angle $\Theta$ of the spray 11 can be less than one degree, or as high as ten degrees.

In some embodiments, a wider angle $\Theta$ of the spray 11 may allow the water to penetrate a greater portion of the above-ground parts of the plant such as the stems, branches, trunk and leaves of the plant. In other embodiments, a narrow angle $\Theta$ of the spray 11 may increase the pressure of the expelled liquid, thereby allowing the liquid to burst the cells of the above-ground parts of the plant, which may increase the lethality of the sprayed liquid. Alternatively, the narrow angle $\Theta$ of the spray 11 may allow the spray to penetrate the ground or soil and reach the roots of a plant, allowing for greater effectiveness in fatally damaging the plant.

As noted above, in some embodiments the spray tip 6 or 406 may be variable such that the user may be able to adjust the angle of the spray 11. In other embodiments, the spray tip 6 or 406 may not be variable and may instead be set at a specific, unadjustable angle. In some embodiments, the applicator 100 may be compatible with a plurality of different spray tips which may have different patterns or configurations. For example, in some embodiments the spray tip 6 or 406 may be directed in a generally fan-shaped spray. In other embodiments, the spray may be directed in a generally conically shaped spray. In some embodiments the spray tip may have a plurality of points which the liquid is expelled from so that the spray tip 6 or 406 may include a plurality of distinct streams. Other combinations or configurations may likewise be used with the applicator 100 or 400.

FIG. 3 depicts an example process 300 of using the applicator 100 or 400 according to various embodiments. In embodiments, water may be introduced to a water line such as water line 8 or 408 of applicators 100 or 400, respectively, at 305. For example, as described above, the water may be introduced to water line 8 or 408 from the water supply line 5 or 405.

Next, herbicide may optionally be introduced from the herbicide chamber 2 or 402 to the water line 8 or 408 at 310, as described above. In other embodiments, the herbicide may not be introduced to the water line 8 or 408. As noted above, the introduction of the herbicide from the herbicide chamber 2 or 402 to the water line 8 or 408 may be dependent upon actuation of the valve 3 or 403.

The liquid in the water line 8 or 408 may then be pressurized at 315. For example, the pump 9 or 409 may pressurize the liquid in the water line 8 or 408. As described above, in some embodiments the applicator 100 or 400 may include a plurality of pumps such as a pump between the water supply 5 or 405 and the herbicide chamber 2 or 402, as well as a pump between the herbicide chamber 2 or 402 and the inline heating unit 1 or 401. In some embodiments, one or more of element 305, 310, and 315 may occur simultaneously or sequentially. For example, in some embodiments, element 315 may occur before or at the same time as one or both of elements 305 or 310.

The pressurized liquid may then be heated at 320. For example, the pressurized liquid in the water line 8 or 408 may be heated by the inline heating unit 1 or 401. Finally, the pressurized heated liquid may be expelled from the spray tip 6 or 406 at 325.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A portable applicator comprising:
a chamber coupled with a water line and configured to store an organic herbicide, the chamber being configured to introduce the organic herbicide from the chamber to a liquid in the water line;
a pump coupled with the water line and configured to pressurize the liquid in the water line, the liquid including the organic herbicide;
an inline heating unit coupled with the water line, the inline heating unit being configured to heat the liquid to create a heated liquid;
a spray tip coupled with the inline heating unit and configured to expel the heated liquid in a single jet of liquid from the applicator;
an applicator body including a human-wearable support, wherein said chamber and said pump are housed within an interior of said applicator body;
a hand held wand including a first terminal end and an opposed second end; and
a hose having an insulated jacket,
wherein:
the hose is directly coupled to the second end of the hand held wand;
the hose is directly coupled to the inline heating unit;
the hand held wand includes a single hollow housing;
the first terminal end of the hand held wand is a terminal end of the single hollow housing;
the spray tip is coupled to the first terminal end of the hand held wand;
the water line extends through the single hollow housing of the hand held wand from the second end of the hand held wand to the spray tip at the first terminal end of the hand held wand;
the spray tip is directly coupled to the terminal end of the single hollow housing; and
the pump, the inline heating unit, and the hose are configured to expel the heated liquid through the hollow housing of the hand held wand and through the spray tip at the terminal end of the single hollow housing.

2. The portable applicator of claim 1, wherein:
the pump is configured to pressurize the liquid in the water line to a pressure of between 100 and 500 pounds per square inch;
the inline heating unit is configured to expel the heated liquid through the hose;
the hose is configured to expel the heated liquid through the hand held wand; and
the hand held wand is configured to expel the heated liquid through the spray tip in the form of the single jet of liquid.

3. The portable applicator of claim 2, wherein:
the pump is configured to pressurize the liquid in the water line to a pressure of at least 250 pounds per square inch; and
the hose having the insulated jacket is flexible such that the spray tip and the single jet of liquid are directable by movement of the hand held wand.

4. The portable applicator of claim 1, wherein:
the inline heating unit is configured to heat the heated liquid to a temperature of at least 150 degrees Fahrenheit; and
the spray tip is configured to expel the heated liquid as a stream of liquid rather than steam to burst cells on a surface of a plant, and to penetrate, by the heated liquid, deeper into layers of the plant.

5. The portable applicator of claim 1, wherein the inline heating unit is positioned between the chamber and the spray tip, and wherein the spray tip is configured to spray the heated liquid in a conically shaped spray.

6. The portable applicator of claim 1, further comprising a water supply line directly connected to the pump, wherein:
the chamber is coupled to the pump via a first section of the water line and via a valve, and the valve is configured to have an open position and a closed position;
the valve is disposed in the first section of the water line between the chamber and the pump;
the inline heating unit is coupled to the chamber via a second section of the water line;
the first section of the water line is coupled to the second section of the water line via a third section of the water line;
the third section of the water line bypasses the chamber;
the chamber receives the pressurized liquid when the valve has the open position;
the pump is configured to pressurize the liquid in the water line to a pressure of between 100 and 500 pounds per square inch;
the spray tip is directly coupled to the first terminal end of the hand held wand;
the hand held wand includes a downward bend to direct the single jet of liquid toward one or more leaves, stems, branches, or a trunk of a plant;
the inline heating unit is configured to expel the heated liquid through the hose;
the hose is configured to expel the heated liquid through the hand held wand; and
the hand held wand is configured to expel the heated liquid through the spray tip in the form of the single jet of liquid.

7. The portable applicator of claim 6, further comprising an electrical line coupled to a switch, wherein:
the chamber is configured to introduce the organic herbicide into the liquid in the water line such that the liquid includes water and the organic herbicide if the valve is in the open position;

the liquid includes only water if the valve is in the closed position;

the switch is housed within the interior of the applicator body;

the switch is directly coupled to the pump and configured to activate and deactivate the pump; and the switch is directly coupled to the inline heating unit and configured to activate and deactivate the inline heating unit.

8. The portable applicator of claim 6, wherein the valve is further configured to have a partially open position.

9. The portable applicator of claim 1, wherein said human-wearable support comprises a strap wearable by a human operator of said applicator.

10. The portable applicator of claim 1, further comprising a water hose connector configured to connect a water hose to said applicator body, and an electric power line connector configured to connect an electric power line to said applicator body.

11. A portable applicator comprising:
a housing including a human body-worn support structure adapted to be worn by a human operator of said applicator;
a chamber positioned within said housing and coupled with a water line, at least a portion of said water line positioned within said housing, said chamber being configured to store an organic herbicide and to introduce the organic herbicide from the chamber to a liquid in the water line;
a pump positioned within the housing and coupled with the water line, the pump being configured to pressurize the liquid in the water line, the liquid including the organic herbicide;
an inline heating unit coupled with the water line, the inline heating unit being configured to heat the liquid to create a heated liquid;
a spray tip coupled with the inline heating unit and configured to expel the heated liquid in a single jet of liquid from the applicator;
a hose having an insulated jacket; and
a hand held wand including a first terminal end and an opposed second end, said spray tip being positioned on said hand held wand, said water line extending from said housing to said hand held wand via the hose having the insulated jacket, and said inline heating unit positioned within one of said housing and said hand held wand,
wherein:
the hose is directly coupled to the second end of the hand held wand;
the hose having the insulated jacket is directly coupled to the inline heating unit;
the hand held wand includes a single hollow housing;
the first terminal end of the hand held wand is a terminal end of the single hollow housing;
the spray tip is coupled to the first terminal end of the hand held wand;
the water line extends through the single hollow housing of the hand held wand from the second end of the hand held wand to the spray tip at the first terminal end of the hand held wand;
the spray tip is directly coupled to the terminal end of the single hollow housing; and
the pump, the inline heating unit, and the hose are configured to expel the heated liquid through the hollow housing of the hand held wand and through the spray tip at the terminal end of the single hollow housing.

12. The portable applicator of claim 11, further comprising a water supply line directly connected to the pump, wherein:
said human body-worn support structure comprises a shoulder strap adapted to be worn over the shoulder of a human operator of said applicator;
the chamber is coupled to the pump via a first section of the water line and via a valve, and the valve is configured to have an open position and a closed position;
the valve is disposed in the first section of the water line between the chamber and the pump;
the inline heating unit is coupled to the chamber via a second section of the water line;
the first section of the water line is coupled to the second section of the water line via a third section of the water line;
the third section of the water line bypasses the chamber;
the chamber receives the pressurized liquid when the valve has the open position;
the pump is configured to pressurize the liquid in the water line to a pressure of between 100 and 500 pounds per square inch;
the spray tip is directly coupled to the first terminal end of the hand held wand;
the hand held wand includes a downward bend to direct the single jet of liquid toward one or more leaves, stems, branches, or a trunk of a plant;
the inline heating unit is configured to expel the heated liquid through the hose;
the hose is configured to expel the heated liquid through the hand held wand; and
the hand held wand is configured to expel the heated liquid through the spray tip in the form of the single jet of liquid.

* * * * *